2,729,657

PREPARATION OF FATTY ACYL DERIVATIVES OF AMINO ACIDS

Irving Joseph Krems, Fort Lee, N. J., assignor to Colgate-Palmolive Company, Jersey City, N. J., a corporation of Delaware No Drawing. Application July 19, 1951, Serial No. 237,691

10 Claims. (Cl. 260—404)

The present invention relates to an improved process for the preparation of fatty acyl derivatives of amino acids in high yield and purity.

The condensation products of fatty substances and lower amino acids are known in the art and have been suggested for use as wetting, dispersing, textile-treating agents, etc. These products have generally been prepared by reacting a fatty acylating substance, such as the acid, acid chloride or ester, with an appropriate amino acid in the presence of a base. The products from such processes and the like are obtained often in relatively poor yield with a significant proportion of undesirable by-products which lessens their suitability for certain uses. It is requisite to the effectiveness of such condensation products for certain uses that these agents be employed in a substantially pure state.

It has now been discovered that fatty acid amides of lower amino acids may be obtained in high yield and in substantially pure condition by a process conducive of commercial operation. The present invention relates to a process for the preparation of a higher fatty acid amide of a lower aliphatic amino monocarboxylic acid which comprises condensing higher fatty acid halide with a salt of a lower aliphatic amino monocarboxylic acid having a reactive hydrogen atom attached to the free amino group to form a salt of the higher fatty acid amide of said amino acid as a condensation product in an aqueous medium while maintaining the pH of the reaction mixture between 9 and 12.5 until the substantial completion of the reaction and in the presence of a hydrogen halide acceptor for the hydrogen halide liberated in the condensation reaction, acidifying the resulting reaction mixture to a pH from about 2 to 4.5 to convert said condensation product to the higher fatty acid amide of said amino acid, and recovering the latter compound. It is an added feature of the present invention that the condensation product may be subjected to heat treatments to attain the proper physical characteristics of the mixture whereby said amide may be separated as an oil from the residual mixture in substantial purity.

The higher fatty acylating halides may be derived from pure, impure, or commercial grades of fatty acids and the like. More particularly, these reactants may be produced from fatty oils, fats, greases, and other natural sources or from synthetic origin such as derived from the oxidation of hydrocarbons. These fatty halides or acids generally have about 8–24 carbons atoms, and preferably about 12 to 18 carbons. According to their origin and degree and manner of purification, these higher fatty acids may be admixed or associated with other substances of higher and lower molecular weight. Suitable acylating halides are the acid chlorides and acid bromides of caprylic, caproic, lauric, myristic, palmitic, stearic, oleic, linoleic, etc. These substances may be used alone, or in any desired mixture thereof such as the higher fatty acid mixtures derived from coconut, palm kernel, palm, olive, tallow, cottonseed, "topped" coconut oil fatty acids produced by the removal of a low-boiling fraction, e. g. 10–15%, from coconut oil fatty acids, and their hydrogenated derivatives, etc.

The amino acids to be condensed therewith are the lower aliphatic amino monocarboxylic acids having a reactive hydrogen atom attached to the nitrogen atom. The amino group may be unsubstituted such as in glycine, or have an inert substituent thereon, e. g. alkyl groups, etc. It is preferred to use the $\alpha$-amino monocarboxylic acids. Suitable examples are glycine (aminoethanoic acid), alanine (2-amino propanoic acid), sarcosine (methyl glycine), valine ($\alpha$-aminoisovaleric), leucine ($\alpha$-aminoisocaproic), etc.

The fatty acid halide and amino acid may be employed in any suitable proportions in an aqueous medium to form the monomolecular condensation product. In general, the reaction may be conducted by employing substantially stoichiometric ratios of the reactants. It may be desirable to use an excess of the amino compound rather than an excess of the acid halide since the latter condition will tend to yield undesirable by-products such as free fatty acids, soaps, or the like, in aqueous medium. Generally, no external heat need be applied; the exothermic heat of the reaction usually results in elevating the temperature of the mixture to about 50–60° C. If desired, however, elevated temperatures up to the refluxing temperature of the mixture or, if necessary, up to about 100° C. may be employed satisfactorily though excessive elevated temperatures tend to increase the yield of undesirable by-products. The amount of water is not critical and is to be sufficient to form a fluid reaction or inert solvent medium which may be agitated during the reaction if desired. An inert organic solvent may also be present in the aqueous medium if desired, such as halogenated hydrocarbons (e. g. ethylene dichloride), hydrocarbons, etc.

Such condensation reactions should occur in the presence of an acceptor for the liberated hydrogen halide, which may be added initially or during the course of the reaction either continuously or in increments, provided the pH is maintained within the desired limits. The acceptor may be any suitable alkaline substance capable of neutralizing both newly liberated hydrogen halide eliminated by the condensation reaction and any hydrogen halide previously combined with the amino group whereby said amino group is free to react with the fatty acid halide to form the corresponding amide. Any suitable neutralizing agent may be employed such as the alkali metal hydroxides (e. g., sodium, potassium and lithium hydroxide), potassium carbonate, sodium carbonate, lithium carbonate, sodium bicarbonate, magnesium hydroxide, calcium hydroxide, etc., as well as organic amines having a non-replaceable hydrogen atom, e. g., trimethylamine, pyridine, excess amino acid, etc. Such acceptor for hydrogen halide will usually be employed in stoichiometric or equivalent amounts with the reactants, since for example one mol of alkali metal hydroxide acceptor will neutralize a mol of liberated hydrogen halide produced by the condensation of one mol of each of the reactants.

It has been found that high yields of the desired amide condensation product with a minimum of by-products and impurities may be obtained if the reaction is conducted in an aqueous alkaline system while maintaining the pH of the reaction mixture between 9 to 12.5 until the substantial completion of the reaction, with optimum results obtained at about 10–11. It is possible to obtain thereby yields in excess of about 90% even in commercial operation. To maintain such pH limits, any appropriate alkalizing agent may be added which insures the required alkalinity of solution, such as the addition of alkali metal or alkaline earth metal bases. In such latter group, it is intended to include the alkali or alkaline earth metals or their electrolytes which are capable of furnishing hydroxyl ions in aqueous solution, e. g. sodium hydroxide, potassium hydroxide, calcium hydroxide, barium hydroxide, sodium metal, sodium hydride, sodium carbonate-sodium hydroxide mix, etc. It is preferred to use the hydroxides and usually the alkali metal bases because of their extreme alkalinity in solution and general avoidance of possible side reactions. Optimum results are effected with the use of the caustic alkalis such as sodium and potassium hydroxide. The use of weaker bases, such as sodium bicarbonate, is included since such substances may be added to the solution to furnish also the necessary amount of base provided the final alkalinity of the solution is within the desired range. These bases may be utilized in any form though it is preferred to use dilute or concentrated aqueous solutions for addition to the aqueous reaction medium.

The specified pH limits are requisite and critical to the attainment of a high yield of condensation product substantially free from impurities and by-products. A prolonged unduly high alkalinity of the reaction mixture tends to promote hydrolysis of the acid chloride, increasing undesirable by-products with corresponding reduction in the amount of reacting material. The use of a pH range on the lower side substantially outside the specified range is particularly critical resulting in a higher rate of undesired hydrolysis, and incomplete condensation since it is a region of higher concentration of Zwitterions further resulting in loss of reactable amino acid material. During the condensation reaction, it will be found that the temperature will rise generally, e. g. 20–30° C., due to the exothermic heat of reaction. The completion of the reaction may be determined in any suitable manner such as, for example, when the pH of the reaction mixture has become constant after the materials have reacted. The reaction mixture at the end of the reaction will usually be in the form of a clear solution since the various products are soluble in alkaline solution of the order indicated.

It is usually preferred that the same general type of alkaline material be employed both as a halide acceptor and to maintain the desired alkalinity of solution. Under such circumstances, an appropriate amount of base, e. g. sodium hydroxide, sufficient to maintain the alkalinity of solution and to neutralize the liberated hydrogen halide should be employed. The base may be added before or during the condensation of the reacting materials provided the alkalinity of the solution is maintained. As indicated aforesaid, the amino acid material should be employed in a form such that the amino group is free and the carboxylic group is neutralized in the form of its salt under the conditions of the reaction. This may be accomplished by employing the desired salt of the amino acid, e. g., sodium salt of sarcosine, as the initial reacting material. Any of the neutralizing agents or bases previously set forth may be used to form the corresponding salts if desired. Alternatively, the amino acid per se may be used intially and sufficient alkali or other base to insure salt formation of the carboxyl group being added prior to or during the admixture of the reactants.

At the conclusion of the reaction, the pH of the solution should be reduced by acidifying the same to effect substantially complete acidification of the carboxylic salt grouping in the condensation product. It is requisite that the pH be reduced to at least about 4.5 and usually about 2 to 4, preferably 2.5 to about 3.5. Within such limits, acidification to the free acid is obtained quantitatively without any harmful excess of strong acid. By such procedure, it is possible to separate the condensation product in the form of its free acid easily and completely from the reaction mixture. If substantially complete acidification is not utilized, undesirable amounts of the salt of the condensation product will remain in admixture resulting in the formation of troublesome emulsions and poor phase separation. Any suitable acidic material may be employed, such as the mineral acids, e. g. sulphuric acid, hydrochloric acid, etc.

After appropriate acidification, the material usually appears to be in the form of a semi-solid or gelatinous mass. It is considered that the condensation product in the form of its free acid is emulsified therein resulting in a gel-like material occluded with various impurities and from which the desired product may be separated with difficulty.

Any suitable means of separation may be employed however. Thus the mixture may be solvent extracted with an inert organic solvent such as ethyl ether, for example, and thereby recovered satisfactorily. The solvent can be separated in any desirable manner.

It is also an added feature of the present invention that the condensation product may be recovered in a simple and economical manner and in high yield and purity by subjecting the material to a heat treatment sufficient to break out the condensation product from the gel as an oily material. Any suitable temperatures may be employed for such treatment since the desired effect is an observable phenomenon. It is preferred to heat the material between about 50 and 100° C., and usually at about 75° C., with agitation for a sufficient time to break up the gelatinous matter whereupon the desired product may be recovered in any suitable manner. Upon standing or settling, the contents will form two layers, the lower one being aqueous in nature and the upper layer being an oily phase comprising essentially the higher fatty acid amide of the amino acid in high yield and purity. The two layers may be separated by any means suitable for liquid-liquid separation, such as decantation, solvent extracting with an organic solvent such as ether, etc. The desired oily material may be further washed and purified in any suitable manner.

It has also been found that if the acidification is conducted in the cold or at normal room temperatures, an undue amount of objectionable foaming may be encountered during the subsequent heat treatment necessary to effect phase separation. It has been found, however, that if the reaction mixture is subjected to a heat treatment prior to acidification, the undesirable foaming effects hitherto noted are not encountered during the subsequent heat treatment of the acidified gelatinous mass. The condensation product may be heated or maintained at any suitable elevated temperature before reducing the pH to the desired limits. The temperatures set forth immediately above for the heat treatment after acidification, such as about 75° C., are equally suitable herein.

The condensation product in the form of its free acid is useful directly for many purposes. If desired, it may be converted into any desirable carboxylic salt by reaction with the appropriate base such as alkali and alkaline earth metal bases, ammonium hydroxide, etc. In the case of a strong alkali such as sodium hydroxide, the pH should be adjusted to about 9.0 to 9.5 in order to obtain substantially complete salt formation and obtain a neutral product.

The following examples are further illustrative of the nature of the present invention and are not intended to limit the scope thereof in any manner.

Example I

The sodium salt of sarcosine is agitated thoroughly with water at room temperature to form a 6% solution. Lauroyl chloride (95% pure) and caustic soda solution are slowly added to the reaction mixture while maintaining the pH at 10.5±0.3. On a solids basis, the molar ratio of lauroyl chloride to caustic soda to the sarcosine salt is 0.95:1.2:1.1. The reaction mixture is thoroughly agitated with a concurrent temperature rise occurring due to the exothermic heat of reaction, the temperature being maintained at about 50° C. At the completion of the reaction, a clear solution results to which is added 30% sulfuric acid in sufficient amount to reduce the pH of the solution to 3.0±0.2, resulting in the formation of a gelatinous mass. This material is heated to 75° C. with agitation, melting the gel-like material contained therein. After discontinuing the heating, the contents of the reaction vessel are then permitted to settle and form two layers, the lower aqueous layer being drained off. The residual oily upper phase is further purified by the addition of aqueous sulfuric acid of pH 3 and hot wash water, the contents re-heated to 75° C., and permitted to settle into two layers which are separated by decantation. The upper oily layer is the lauroyl amide of sarconsine in yield above 90% based on the amount of acid chloride in about 95% purity in large-scale operation.

To form the desired salt, an equal weight of warm water is added to the hot oily product obtained above to provide a fluid mixture. Caustic soda in the form of a 25% solution is added thereto and the pH of the mixture is carefully adjusted to 9.0–9.5 to form a neutral solution consisting essentially of the sodium salt of lauroyl sarcosine in almost quantitative yield also. The aqueous medium may be removed in any suitable manner to recover the salt product in solid form.

*Example II*

The procedure of Example I is repeated with the modification that the sodium salt of sarcosine is used in the form of a 13% solution, and that prior to acidification, the reaction mixture is heated to 75° C., thereby reducing the viscosity of the mixture and substantially eliminating foaming of the solution during the heat treatment after acidification. The lauroyl sarcosine is similarly recovered in high yield and purity.

*Example III*

The procedure of Example I is repeated using the potassium salt of glycine and myristoyl chloride as the initial reactants in the presence of potassium hydroxide, resulting in the recovery of myristoyl glycine as the condensation product in high yield and purity similarly.

*Example IV*

The condensation procedure of Example I repeated using palmitoyl chloride as an initial reactant, resulting in the formation of the sodium salt of palmitoyl sarcoside as the condensation product. The reaction mixture is acidified with concentrated hydrochloric acid to the same pH, and the mixture shaken and extracted with ethyl ether. The ether extract is washed with water until neutral and dried over anhydrous sodium sulfate. The dried extract is filtered and the solvent is removed by evaporation, yielding a viscous oil in similar high yield (neutral equivalent found: 332; theoretical: 327).

Alternatively, the mixture after acidification may be heated to about 75° C., cooled and subsequently extracted with ether.

The palmitoylsarcosine obtained above is dissolved in methanol and treated with 2 N sodium hydroxide to a pH of 9.5. The methanol solution is concentrated, chilled in ice and the sodium salt of palmitoylsarcosine crystallizes therefrom as small white soft crystals in high yield and purity also.

Although the present invention has been described with reference to particular embodiments and examples, it will be apparent to those skilled in the art that variations and modifications can be substituted therefore without departing from the principles and true spirit of the invention.

Having thus described the invention, what is claimed is:

1. A process for the preparation of a higher fatty acid amide of a lower aliphatic amino monocarboxylic acid which comprises condensing higher fatty acid halide with a salt of a lower aliphatic amino monocarboxylic acid having a reactive hydrogen atom attached to the free amino group to form a salt of the higher fatty acid amide of said amino acid as a condensation product in an aqueous medium while maintaining the pH of the reaction mixture between 9 to 12.5 until the substantial completion of the reaction and in the presence of a hydrogen halide acceptor for the hydrogen halide liberated in the condensation reaction, acidifying the resulting reaction mixture to a pH from about 2 to 4.5 to convert said condensation product to the higher fatty acid amide of said amino acid, and recovering the latter compound.

2. A process for the preparation of N-higher fatty acyl sarcosine which comprises condensing higher fatty acid halide with a soluble salt of sarcosine to form the salt of N-higher fatty acyl sarcosine as a condensation product in an aqueous medium while maintaining the pH of the reaction mixture between 9 to 12.5 until the substantial completion of the reaction and in the presence of a hydrogen halide acceptor for the hydrogen halide liberated in the condensation reaction, acidifying the resulting reaction mixture to a pH from about 2 to 4.5 to convert said condensation product to N-higher fatty acyl sarcosine, and separating said N-higher fatty acyl sarcosine from the reaction mixture.

3. A process for the preparation of N-lauroyl sarcosine which comprises condensing lauroyl chloride with a soluble salt of sarcosine, the proportion of said sarcosine salt being in excess of the amount required to react stoichiometrically with said lauroyl chloride, to form the salt of N-lauroyl sarcosine as a condensation product in an aqueous medium while maintaining the pH of the reaction mixture between 9 to 12.5 until the substantial completion of the reaction and in the presence of a hydrogen chloride acceptor for the hydrogen chloride liberated in the condensation reaction, acidifying the resulting reaction mixture to a pH from about 2 to about 4 to convert said condensation product to N-lauroyl sarcosine, and separating said N-lauroyl sarcosine from the reaction mixture.

4. A process for the preparation of a higher fatty acid amide of a lower amino aliphatic monocarboxylic acid which comprises condensing higher fatty acid halide with a salt of a lower aliphatic amino monocarboxylic acid having a reactive hydrogen atom attached to the free amino group to form a salt of the higher fatty acid amide of said amino acid as a condensation product in an aqueous medium while maintaining the pH of the reaction mixture between 9 to 12.5 until the substantial completion of the reaction and in the presence of a hydrogen halide acceptor for the hydrogen halide liberated in the condensation reaction, acidifying the resulting reaction mixture to a pH from about 2 to 4.5 to convert said condensation product to the higher fatty acid amide of said amino acid, heating the acidified reaction mixture and forming an aqueous phase and an oily phase comprising the higher fatty acid amide of said amino acid, and recovering the latter.

5. A process for the preparation of N-higher fatty acyl sarcosine which comprises condensing higher fatty acid halide with a soluble salt of sarcosine, the proportion of said sarcosine salt being in excess of the amount required to react stoichiometrically with said fatty acid halide, to form the salt of the N-higher fatty acyl sarcosine as a condensation product in an aqueous medium while maintaining the pH of the reaction mixture between 9 to 12.5 until the substantial completion of the reaction and in the presence of a hydrogen halide acceptor for the hydrogen halide liberated in the condensation reaction, acidifying the resulting reaction mixture to a pH from about 2 to 4.5 to convert said condensation product to the N-higher fatty acyl sarcosine, separating the acidified reaction mixture while at a temperature from about 50–100° C. into an aqueous phase and an oily phase comprising said N-higher fatty acyl sarcosine, and recovering the latter.

6. A process for the preparation of N-lauroyl sarcosine which comprises condensing lauroyl halide with a soluble salt of sarcosine, the molar proportion of said sarcosine salt being in excess of the amount required to react stoichiometrically with said lauroyl halide, in an aqueous medium to form the salt of N-lauroyl sarcosine as a condensation product with the liberation of hydrogen halide in the presence of a hydrogen halide acceptor sufficient to neutralize said hydrogen halide while maintaining the pH of the reaction mixture between 9 to 12.5 until the substantial completion of the reaction, acidifying the resulting reaction mixture to a pH of about 2 to about 4 to convert said condensation product substantially to N-lauroyl sarcosine resulting in the formation of a gelatinous mass, liquefying said mass and forming an aqueous phase and an oily phase comprising the N-lauroyl sarcosine, and recovering said N-lauroyl sarcosine by separating said phases.

7. A process for the preparation of N-higher fatty acyl sarcosine which comprises condensing a higher fatty acid halide with a soluble salt of sarcosine to form the salt of N-higher fatty acyl sarcosine as a condensation product in an aqueous medium while maintaining the pH of the reaction mixture between 9 to 12.5 until the substantial completion of the reaction and in the presence of a hydrogen halide acceptor to neutralize the hydrogen halide formed in the condensation reaction, acidifying the resulting reaction mixture to a pH of about 2 to 4.5 and sufficient to convert said condensation product substantially to N-higher fatty acyl sarcosine, extracting the acidified reaction mixture with an organic solvent for said N-higher fatty acyl sarcosine, and separating a solvent extract comprising said N-higher fatty acyl sarcosine.

8. A process in accordance with claim 7 wherein said higher fatty acid halide is palmitoyl chloride resulting in the recovery of N-palmitoyl sarcosine.

9. A commercial unitary process for the preparation of N-higher fatty acyl sarcosine in high yield and purity which comprises adding higher fatty acyl chloride to an aqueous medium containing a soluble salt of sarcosine, the molar proportion of said sarcosine salt being in excess of the amount required to react stoichiometrically with said fatty acyl chloride, condensing said reactants and forming a salt of N-fatty acyl sarcosine as a condensation product with the liberation of hydrogen chloride in the presence of a hydrogen chloride acceptor sufficient to neutralize said hydrogen chloride while maintaining the pH of the reaction mixture between about 10 to about 11 until the substantial completion of the reaction, acidifying the resulting reaction mixture to a pH of about 2 to about 4 to convert said condensation product substantially to N-higher fatty acyl sarcosine resulting in the formation of a gelatinous mass, heating the same at a temperature from about 50–100° C. with agitation for a sufficient time to liquefy said mass, forming therefrom an aqueous phase and an oily phase, and separating said oily phase comprising essentially N-higher fatty acyl sarcosine in high yield and purity.

10. A commercial unitary process for the preparation of sodium N-lauroyl sarcosine in high yield and purity which comprises adding lauroyl chloride to an aqueous medium containing an alkali metal salt of sarcosine, the molar proportion of said sarcosine salt being in excess of the amount required to react stoichiometrically with said lauroyl chloride, condensing said reactants and forming the alkali metal salt of N-lauroyl sarcosine as a condensation product with the liberation of hydrogen chloride in the presence of alkali metal base sufficient to neutralize said hydrogen chloride while maintaining the pH of the reaction mixture between about 10 to about 11 until the substantial completion of the reaction, heating the resulting reaction mixture to a temperature of about 50–100° C. and adding sufficient mineral acid to acidify the same to a pH of about 2 to about 4 to convert said condensation product substantially to N-lauroyl sarcosine resulting in the formation of a gelatinous mass, heating the same at a temperature from about 50–100° C. with agitation for a sufficient time to liquefy said mass, forming therefrom an aqueous phase and an oily phase comprising essentially said N-lauroyl sarcosine, separating said phases and treating said lauroyl sarcosine with sodium-containing alkali sufficient to substantially convert said lauroyl sarcosine to the corresponding sodium N-lauroyl sarcosine in high yield and purity.

References Cited in the file of this patent

UNITED STATES PATENTS

| | | |
|---|---|---|
| 2,041,265 | Orthner et al. | May 19, 1936 |
| 2,063,987 | Dreyfus | Dec. 15, 1936 |
| 2,173,058 | Kritchevsky | Sept. 12, 1939 |
| 2,411,434 | Katzman | Nov. 19, 1946 |
| 2,463,779 | Kester | Mar. 8, 1949 |